(No Model.)

R. L. RICKMAN.
CALF WEANER.

No. 374,005. Patented Nov. 29, 1887.

WITNESSES:
George Binkenburg
E. M. Clark

INVENTOR:
R. L. Rickman
BY Munn & Co.
ATTORNEYS.

N. PETERS, Photo-Lithographer, Washington, D. C.

UNITED STATES PATENT OFFICE.

ROBERT L. RICKMAN, OF GRAHAM, TEXAS.

CALF-WEANER.

SPECIFICATION forming part of Letters Patent No. 374,005, dated November 29, 1887.

Application filed April 27, 1887. Serial No. 236,315. (No model.)

*To all whom it may concern:*

Be it known that I, ROBERT L. RICKMAN, of Graham, in the county of Young and State of Texas, have invented a new and Improved Calf-Weaner, of which the following is a full, clear, and exact description.

My invention relates to an improvement in calf-weaners, and has for its object to provide a device of simple and cheap construction which may be quickly and easily applied, and wherein the said device, while enabling the calf to graze, will effectually prevent its milking the mother.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1:
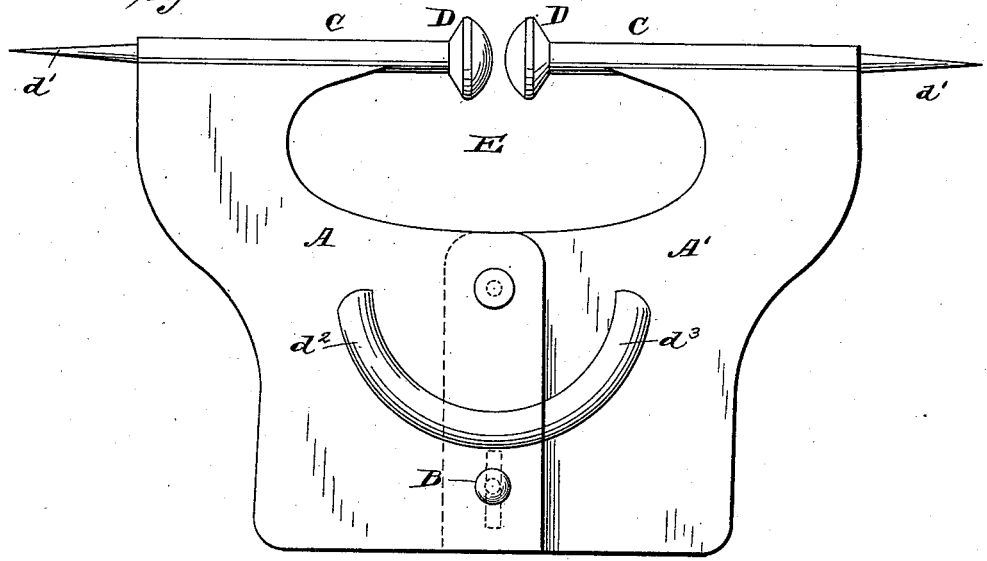
Figure 2:
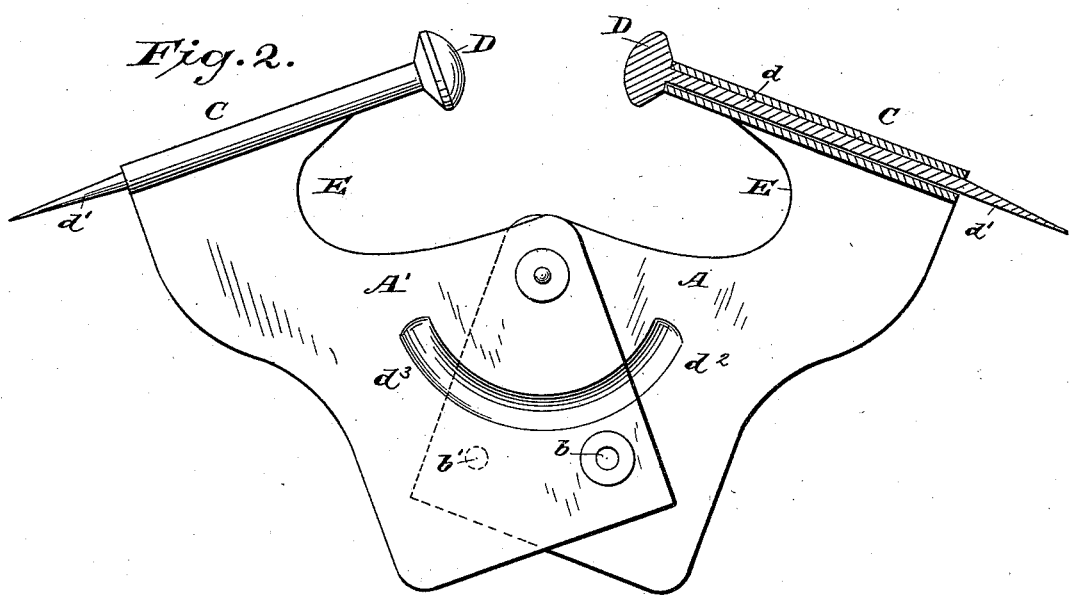

Figure 1 is a front elevation of the device, and Fig. 2 is a rear elevation, partly in section.

A A' represent two plates of equal size and preferably the same contour, which, overlapping one another centrally, are pivoted at a point approximating the center, and provided near the lower edge in alignment with said pivotal point with registering apertures $b\ b'$, whereby the two plates are held in rigid contact through the medium of a pin, B, passing through said apertures and bent outward upon the opposite side of the outer plate, or provided with a suitable nut or equivalent fastening. Each plate at the top is bent over upon itself to form eyes C, the said eyes being spaced centrally and provided with aligning and opposing buttons D, secured therein by integral shanks $d$, which shanks are adapted to project beyond the outer ends of each eye about an inch, terminating in a sharp point, $d'$, the purpose of which is to prick the cow when the calf attempts to milk the same. The space intervening the said buttons when in their normal position is less than the thickness of the cartilage of the nostril of a calf. An aligning recess, E, is cut in each plate at the top, to permit the calf to breathe without difficulty, the said recesses when united forming, preferably, more or less of an ellipse, as shown in Fig. 1. In the outer surface of each plate aligning semicircular beads $d^2$ and $d^3$ are produced concentric with the pivot-pin of the plates, which beads not only serve to strengthen the plates, but also to act as a guide and stop for the plates when the device is opened for attachment to the nostril, as by means of the one bead sliding over the other the space between the buttons may be enlarged, as desired, and the plates held stationary at any point in the radius of the beads.

In operation the pin B is withdrawn and the plates slide one upon the other, as shown in Fig. 2. The buttons are then placed each side of the cartilage of the nostril, and the plates are brought to a vertical position, and the pin reinserted and fastened. This action causes the buttons to clamp the cartilage of the nostril firmly, holding the plates therefore in suspension over the mouth.

Having thus described my invention, what I claim as new, and desire to secure by Letters Patent, is—

1. A calf-weaner consisting of the pivoted plates A A', provided with upper aligning recesses, E, horizontal aligning eyes C, having opposing buttons D, secured to their inner ends, and goads $d'$, projecting from their outer ends, the registering apertures $b\ b'$, and detachable fastening-pin B, substantially as herein shown and described.

2. A calf-weaner consisting of the pivoted plates A A', provided with upper aligning recesses, E, horizontal aligning eyes C, having opposing buttons D, secured to their inner ends, and goads $d'$, projecting from their outer ends, aligning segmental concavo-convex surfaces $d^2\ d^3$, whereby the plates are guided, the registering apertures $b\ b'$, and pin B, whereby the plates are secured in a closed position, substantially as herein shown and described.

ROBT. L. RICKMAN.

Witnesses:
 H. J. MARTYN,
 CHAS. O. JOLINE.